US011155132B2

(12) United States Patent
    Pack

(10) Patent No.: US 11,155,132 B2
(45) Date of Patent: Oct. 26, 2021

(54) WEIGHT DISTRIBUTION TAG TRAILER

(71) Applicant: Roy Pack, Altoona, IA (US)

(72) Inventor: Roy Pack, Altoona, IA (US)

(*) Notice: Subject to any disclaimer, the term of this patent is extended or adjusted under 35 U.S.C. 154(b) by 306 days.

(21) Appl. No.: 16/217,299

(22) Filed: Dec. 12, 2018

(65) Prior Publication Data

US 2019/0202250 A1    Jul. 4, 2019

Related U.S. Application Data

(60) Provisional application No. 62/612,115, filed on Dec. 29, 2017.

(51) Int. Cl.
| | | |
|---|---|---|
| *B60D 1/24* | (2006.01) | |
| *B60D 1/62* | (2006.01) | |
| *B62D 61/02* | (2006.01) | |
| *B60D 1/06* | (2006.01) | |
| *B62D 63/06* | (2006.01) | |
| *B60D 1/167* | (2006.01) | |
| *B60D 1/173* | (2006.01) | |
| *B60P 3/00* | (2006.01) | |

(52) U.S. Cl.
    CPC .............. *B60D 1/247* (2013.01); *B60D 1/06* (2013.01); *B60D 1/167* (2013.01); *B60D 1/173* (2013.01); *B60D 1/62* (2013.01); *B60P 3/00* (2013.01); *B62D 61/02* (2013.01); *B62D 63/065* (2013.01)

(58) Field of Classification Search
    CPC .......... B60D 1/06; B60D 1/167; B60D 1/173; B60D 1/247; B60D 1/62; B62D 61/02; B62D 63/065; B60P 3/00; B60P 3/32; B60P 3/40
    See application file for complete search history.

(56) References Cited

U.S. PATENT DOCUMENTS 1,993,591 A * 3/1935 Carpenter .............. B60D 1/173
                                                280/460.1
2,460,466 A * 2/1949 Nogle ................ B62D 53/0864
                                                280/476.1
(Continued)

FOREIGN PATENT DOCUMENTS

DE    202010016076    12/2010
FR         2151720     9/1971
FR         2209347    12/1972

OTHER PUBLICATIONS mr.trailer.com, Automated Safety Hitch, Time for a Change in the Way We Think about Towing, Online Article, May 9, 2010.

*Primary Examiner* — Minnah L Seoh
*Assistant Examiner* — Maurice L Williams
(74) *Attorney, Agent, or Firm* — David M. Breiner; BrownWinick Law Firm

(57)    ABSTRACT

The present invention comprises a weight distribution tag trailer, having at least some of the following features: (a) a frame assembly, including beams and cross beams and side axle beams, (b) an axle coupled to the frame assembly, (c) shims for optional position between an axle assembly and the side axle beams to allow adjustment of load and balance (d) at least two wheels rotatably mounted to the axle, wherein at least one beam includes an end complementarily sized to be received by a vehicle receiver hitch assembly, and at least one other beam includes a clamp for coupling the beam to a cross frame of the vehicle receiver hitch.

11 Claims, 7 Drawing Sheets

(56) References Cited

U.S. PATENT DOCUMENTS

| | | | | |
|---|---|---|---|---|
| 2,570,482 | A * | 10/1951 | Pruitt | B62D 53/0864 280/476.1 |
| 3,033,593 | A * | 5/1962 | Zaha | B60D 1/173 280/460.1 |
| 3,191,963 | A * | 6/1965 | Prichard | B62D 61/125 280/81.1 |
| 3,436,096 | A * | 4/1969 | Rogge | B62D 53/0857 280/762 |
| 3,612,575 | A * | 10/1971 | Stewart | B62D 13/06 280/474 |
| 3,664,679 | A | 5/1972 | Hille | |
| 3,704,896 | A | 12/1972 | Buelow | |
| 3,711,112 | A | 1/1973 | Puckett | |
| 3,752,496 | A | 8/1973 | Meinecke, Jr. | |
| 3,815,939 | A * | 6/1974 | Pettay | B62D 53/0864 280/474 |
| 3,837,677 | A | 9/1974 | Haskins | |
| 4,106,795 | A * | 8/1978 | Henning | A01B 59/048 172/834 |
| 4,133,552 | A * | 1/1979 | Sheine | B60D 1/322 172/272 |
| 4,253,679 | A * | 3/1981 | Sargent | B60D 1/66 280/405.1 |
| 4,664,403 | A * | 5/1987 | Livingston | B60D 1/06 280/460.1 |
| 4,950,010 | A * | 8/1990 | Denny | B60D 1/54 280/460.1 |
| 5,280,939 | A | 1/1994 | Kee et al. | |
| 5,382,041 | A * | 1/1995 | Keith | B60D 1/07 280/426 |
| 5,860,668 | A | 1/1999 | Hull et al. | |
| 6,164,683 | A * | 12/2000 | Kalman | B60P 3/07 211/17 |
| 6,224,083 | B1 * | 5/2001 | Tyler | B60D 1/00 180/209 |
| 6,290,248 | B1 * | 9/2001 | Yrigoyen | B60D 1/07 280/416.1 |
| 6,419,247 | B1 * | 7/2002 | Moran | B62D 53/045 280/476.1 |
| 6,485,046 | B1 * | 11/2002 | Hsueh | B60D 1/065 280/455.1 |
| 6,626,449 | B2 * | 9/2003 | Hazen | B60D 1/065 280/460.1 |
| 6,659,490 | B1 * | 12/2003 | Simpson | B62D 53/08 280/415.1 |
| 6,685,211 | B2 * | 2/2004 | Iles | B60D 1/075 280/267 |
| 6,755,433 | B2 * | 6/2004 | Krauss | B60D 1/065 280/456.1 |
| 7,874,572 | B2 * | 1/2011 | Buehler | E01F 15/148 280/474 |
| 8,042,826 | B1 | 10/2011 | Ramsdell | |
| 9,573,639 | B1 * | 2/2017 | Furtado | B62D 63/064 |
| 2003/0062707 | A1 * | 4/2003 | Koch | B62D 63/061 280/401 |
| 2003/0090083 | A1 * | 5/2003 | Williams | B60D 1/173 280/460.1 |
| 2007/0126196 | A1 | 6/2007 | Klahn | |
| 2007/0145713 | A1 | 6/2007 | Montag | |
| 2007/0200316 | A1 | 8/2007 | Jamieson | |
| 2010/0181743 | A1 * | 7/2010 | Timmons, Jr. | B60D 1/30 280/442 |
| 2011/0266776 | A1 * | 11/2011 | Kapels | B60D 1/52 280/656 |
| 2014/0210182 | A1 * | 7/2014 | Knight | B60P 3/40 280/404 |
| 2017/0036718 | A1 * | 2/2017 | S nchez Cabeza | B62D 63/064 |
| 2017/0240011 | A1 * | 8/2017 | Lisby | B60D 1/488 |

\* cited by examiner

WEIGHT DISTRIBUTION TAG TRAILER

CROSS REFERENCE TO RELATED APPLICATIONS

This application claims benefit of U.S. Provisional Application No. 62/612,115 which was filed on Dec. 29, 2017, the entirety of which is incorporated herein fully by reference.

FIELD OF THE INVENTION

The present invention relates to vehicle weight distribution systems. Particularly the present invention relates to weight distribution trailers for pickup trucks, vans and sport utility vehicles. The present invention provides an auxiliary means for vehicles to more particularly distribute the weight being transported. The inventive auxiliary means is reasonably simple to install and use. Specifically, the present invention comprises a weight distribution tag trailer (WDTT).

BACKGROUND

Since the invention of the wheel, humans have been perfecting the art of transporting cargo over land. Today, motorized vehicles such as cars, trucks and recreational vehicles have become the standard means for individuals to transport themselves and their cargo. A great way to increase the versatility of these vehicles is to add a living or recreational space in the bed of a pickup. However, "truck campers" continue to grow in size and amenities, which add to the weight of the truck and the stress put on the drive axle.

Prior art solutions for distributing weight for heavy hauling vehicles include full-floating axles, semi-floating axles, dead axles, pusher axles, drop axles, and lift axles. A full floating axle carries the vehicle's weight on the axle casing, not the half shafts. These axles serve only to transmit torque from the differential to the wheels. The full floating axle "floats" inside an assembly carrying the vehicle's weight. Thus, the only stress the axle must endure is torque (non-lateral bending force). Full-floating axle shafts are retained by a flange bolted to the hub, while the hub and bearings are retained on the spindle by a large nut. The full-floating design is typically used in most ¾ and 1-ton light trucks, medium duty trucks and heavy-duty trucks, as well as most agricultural applications, such as large tractors and self-propelled agricultural machinery. The overall assembly of a full floating design can carry more weight than a semi-floating or non-floating axle assembly, because the hubs have two bearings riding on a fixed spindle. A full-floating axle can be identified by a protruding hub to which the axle shaft flange is bolted.

Another benefit of a full-floating axle is that even if an axle shaft (used to transmit torque or power) breaks, the wheel will not come off, preventing serious accidents. In contrast, a semi-floating design carries the weight of the vehicle on the axle shaft itself; there is a single bearing at the end of the axle housing carrying the load from the axle and the axle rotates through.

Some dump trucks and trailers may be configured with a lift axle (also known as an airlift axle or drop axle), which may be mechanically raised or lowered. The lift axle is lowered to increase the weight capacity, or to distribute the weight of the cargo over more wheels, for example to cross a weight restricted bridge. When not needed, the lift axle is lifted off the ground to save wear on the tires and axle, and to increase traction in the remaining wheels. Lifting an axle also alleviates lateral scrubbing of the additional axle in very tight turns, allowing the vehicle to turn more readily. In some situations, removal of pressure from the additional lift axle is necessary for the vehicle to complete a turn at all. Several manufacturers offer computer-controlled airlift, so the dead axles are automatically lowered when the main axle reaches its weight limit. The dead axles can still be lifted by the press of a button if needed, for better maneuverability.

While the semi and full-floating designs work well for relatively small loads, increased weight, such as the weight of contemporary "truck campers" can prove to be too much for these axle designs. While the airlift and drop axles have proven to be effective in providing auxiliary suspension for larger vehicles such as dump and concrete trucks, these designs for smaller vehicles such as ½ up to 1-ton pickups are unrealistic due to the limits these additions put on the truck's usage (e.g., use of the truck bed and aesthetics).

Another option is the dead axle, also called a lazy axle. It is not part of the drivetrain, but is instead free-rotating. The rear axle of a front-wheel drive car is usually a dead axle. Many trucks and trailers use dead axles for strictly load-bearing purposes. A dead axle located immediately in front of a drive axle is called a pusher axle.

A tag axle is a type of dead axle and is situated behind a drive axle. Dead axles are also found on semi-trailers, farm equipment, and certain heavy construction machinery serving the same function, namely, providing suspension. On some vehicles the tag axle may be steerable. In some designs the wheels on a dead (a.k.a. lazy) axle only encounter ground when the load is significant, thus saving unnecessary tire wear.

These solutions are limited almost exclusively to larger heavy hauling vehicles such as those mentioned above and their implementation in smaller trucks is unrealistic as it adds to the cost of the vehicle and is not aesthetically appealing.

Accordingly, there remains a continuing need for improved cargo carrying capacity on vehicles carrying heavy loads in the bed of the vehicle such as, but not limited to, smaller trucks. There is a need to provide a versatile way to improve suspension and distribute the weight carried in the bed of a vehicle. There is also a need to provide the ability to adjust the position of wheel assemblies to better accommodate the weight distribution of the cargo.

Therefore, what is needed is a stable way to distribute weight of a payload in the bed of a truck and improve cargo carrying capacity in smaller trucks by providing a weight distribution tag trailer (hereafter "WDTT") designed specifically to add suspension capacity and to better distribute the weight of any payload in the bed of a truck and provide for better control of the vehicle.

SUMMARY

Therefore, it is a primary object, feature, or advantage of the present invention to improve over the state of the art by improving small truck carrying capacity.

In some embodiments of the present invention, a weight distribution tag trailer (WDTT), may have one or more of the following features: (a) a frame assembly, the frame assembly including at least two cross beams and at least two side axle beams coupled to form the frame assembly, (b) an axle coupled to the frame assembly, (c) at least two wheels rotatably mounted to the axle, (d) a center main beam transversely coupled to the frame, wherein the center main beam includes a first end extending outwardly from the frame assembly the first end capable of being received by a receiver opening on a vehicle receiver hitch assembly, (e) an attachment beam transversely coupled to the frame, wherein the attachment beam includes an attachment clamp for coupling the attachment beam to a cross frame of the vehicle receiver hitch assembly or other securement on the vehicle, (f) a second attachment beam transversely coupled to the frame, wherein the second attachment beam includes a clamp for coupling the second attachment beam to the cross frame of the vehicle receiver hitch assembly or other securement on the vehicle, (g) brakes coupled to at least two wheels, (h) brake lights electrically connected to a vehicle and operable by the vehicle, and, optionally, (i) a ball hitch coupled to a distal end of the center main beam and shims positioned between a torsion axle assembly and the side axle beams to adjust load and balance.

In some embodiments of the present invention a weight distribution tag trailer may have one or more of the following features shown in the figures included herein.

One or more of these and/or other objects, features, or advantages of the present invention will become apparent from the specification and claims that follow. No single embodiment need provide each object, feature, or advantage. Different embodiments may have different objects, features, or advantages. Therefore, the present invention is not to be limited to or by an object, feature, or advantage stated herein.

BRIEF DESCRIPTION OF THE DRAWINGS

Illustrated embodiments of the disclosure are described in detail below with reference to the attached drawing figures, which are incorporated by reference herein.

DETAILED DESCRIPTION

Figure 1:
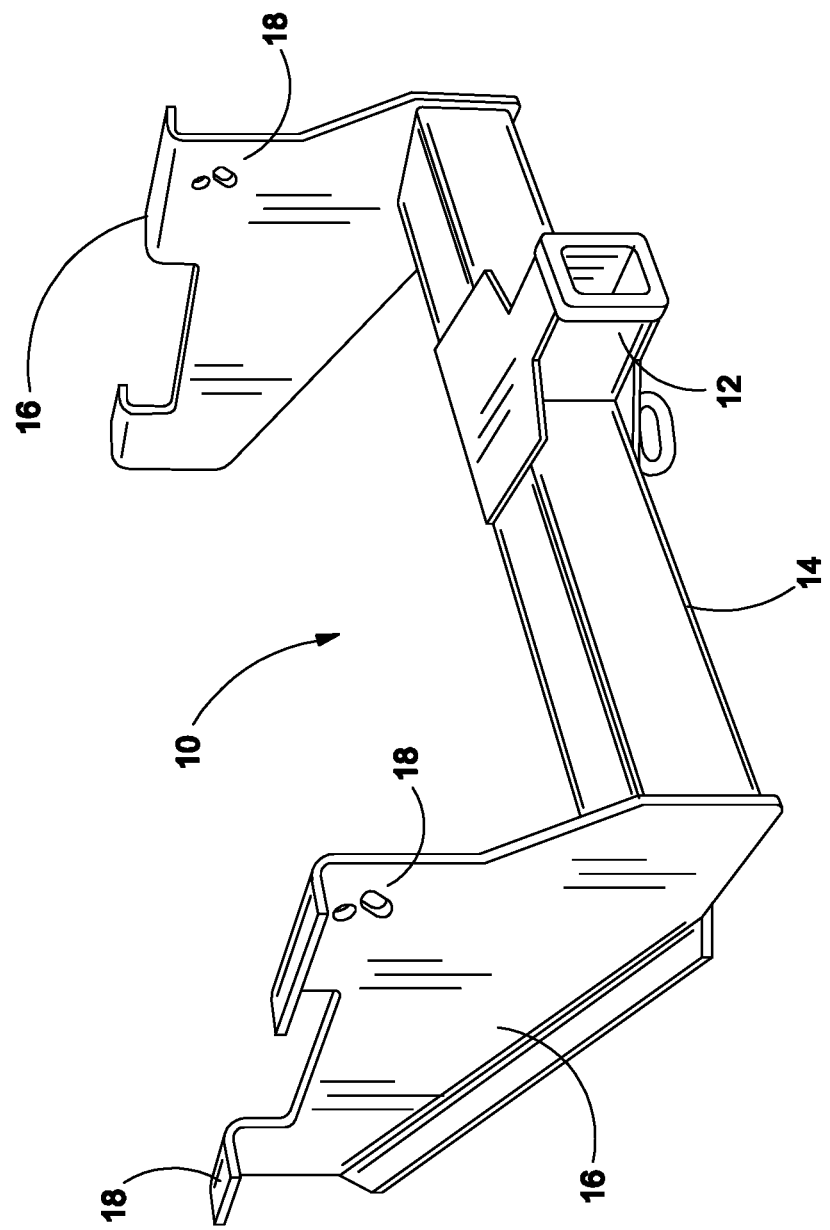
FIG. 1 illustrates a side perspective view of a prior art, O.E.M. (or equivalent) class III-IV-V receiver hitch assembly.

The following discussion is presented to enable a person skilled in the art to make and use the present teachings. Various modifications to the illustrated embodiments will be clear to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings. While embodiments of the present invention are discussed in terms of weight distribution tag trailers ("WDTT"), it is fully contemplated that embodiments of the present invention could be used in most any weight distribution trailer application without departing from the spirit of the invention.

Figure 7:
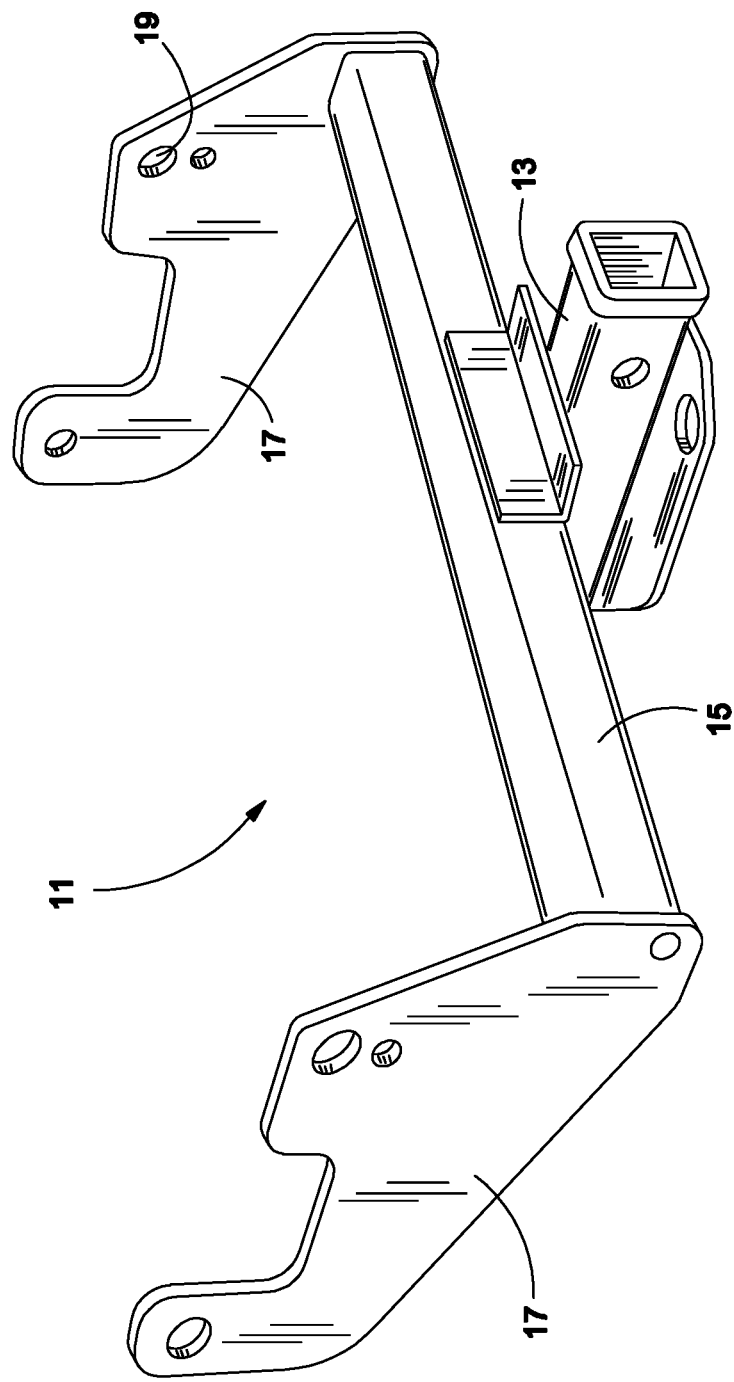
FIG. 7 illustrates a perspective view of prior art

With reference to FIGS. 1 and 7, an O.E.M. (Original Equipment Manufacturer) or equivalent, class III-IV-V receiver hitch assembly 10 and assembly 11 are shown. A receiver hitch assembly 10 or 11 can be attached to a vehicle frame before or after market. As shown in FIGS. 1 and 7, a receiver opening 12 accepts most any type of towing connectors and is discussed in greater detail below. Referring to FIG. 1, a cross frame 14 is coupled to receiver frame-arms 16, typically as one piece or welded on. Receiver frame-arms 16 are then coupled to the frame of a vehicle with a fastener through coupling 18, with a nut and bolt assembly, riveted and/or sometimes welded for permanency. As shown in FIG. 7, a drop style receiver 11 may alternatively be used and comprises a receiver opening 11, a cross frame 15, receiver arms 17, and coupling 19. The method of connection of receiver hitch assembly to the vehicle is peripheral to the discussion of the present invention and alternative connections are generally known to those skilled in the art.

Figure 2:
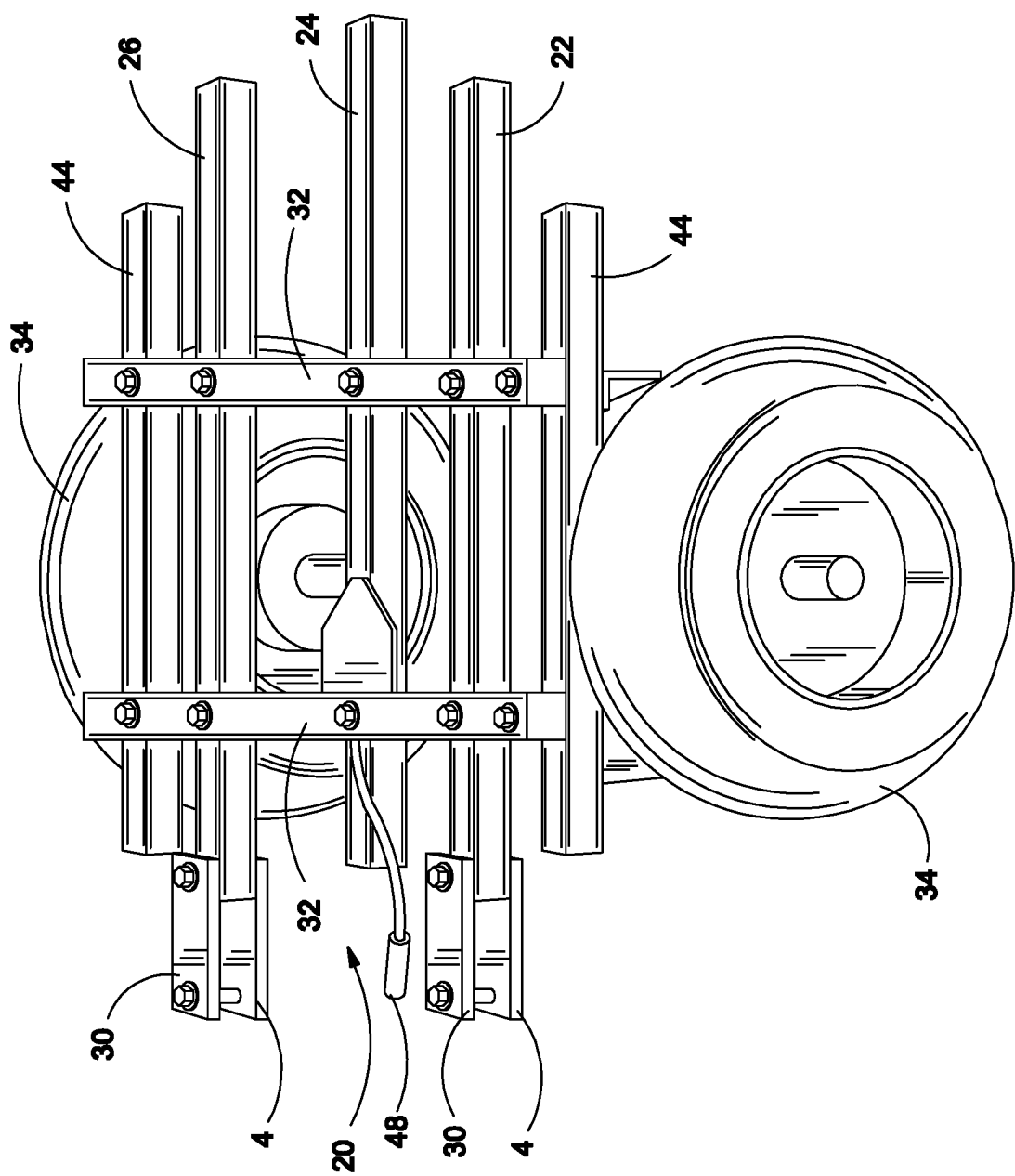
FIG. 2 illustrates a side perspective view of a weight distribution tag trailer in accordance with an embodiment of the present invention.
Figure 6:
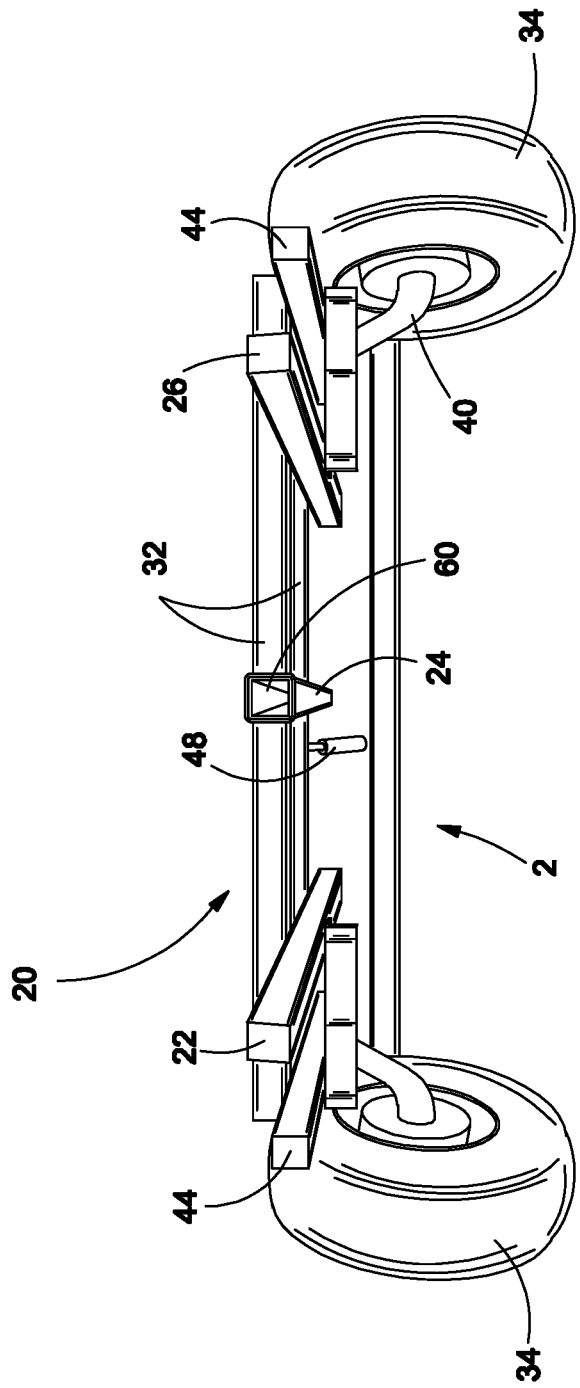
FIG. 6 provides a rear view of a weight distribution tag trailer in accordance with an embodiment of the present invention.

With reference to FIGS. 2 and 6, two views of a weight distribution tag trailer 20 in accordance with an embodiment of the present invention is shown. The weight distribution tag trailer, referenced as numeral 20, hereinafter referred to as WDTT 20, includes a frame assembly 2, torsion axle assembly 40, wheels or wheel assemblies as are known in the art 34 rotatably mounted to the torsion axle assembly 40 (see FIG. 6) and a braking assembly (not shown, but may comprise a commonly known braking assembly, e.g., electric drum brakes). Frame assembly 2 is comprised of attachment beams 22 and 26 and center main beam 24 transversely coupled to cross beams 32, which are coupled to side axle beams 44. The WDTT 20 can be attached to the O.E.M. receiver hitch assembly 10 or 11 (See FIG. 1 and FIG. 7) of a towing vehicle with attachment beams 22 and 26 and center main beam 24. The center main beam 24 plugs into or is received by the receiver opening 12 and can be held in place with pin assembly or other securement as known in the art. The two attachment beams 22 and 26 clamp onto (or are otherwise associated by methods known in the art) the O.E.M. hitch assembly 10 or 11 cross frame 14 or 15 with attachment clamps 30 as far out as possible—approximately in line with the towing vehicle's main frame. Attachment clamps 30 are held to receiver cross frame 14 or 15 with a nut a bolt assembly 4, but can be secured to cross frame 14 or 15 in most any fashion without departing from the spirit of the invention.

Figure 5:
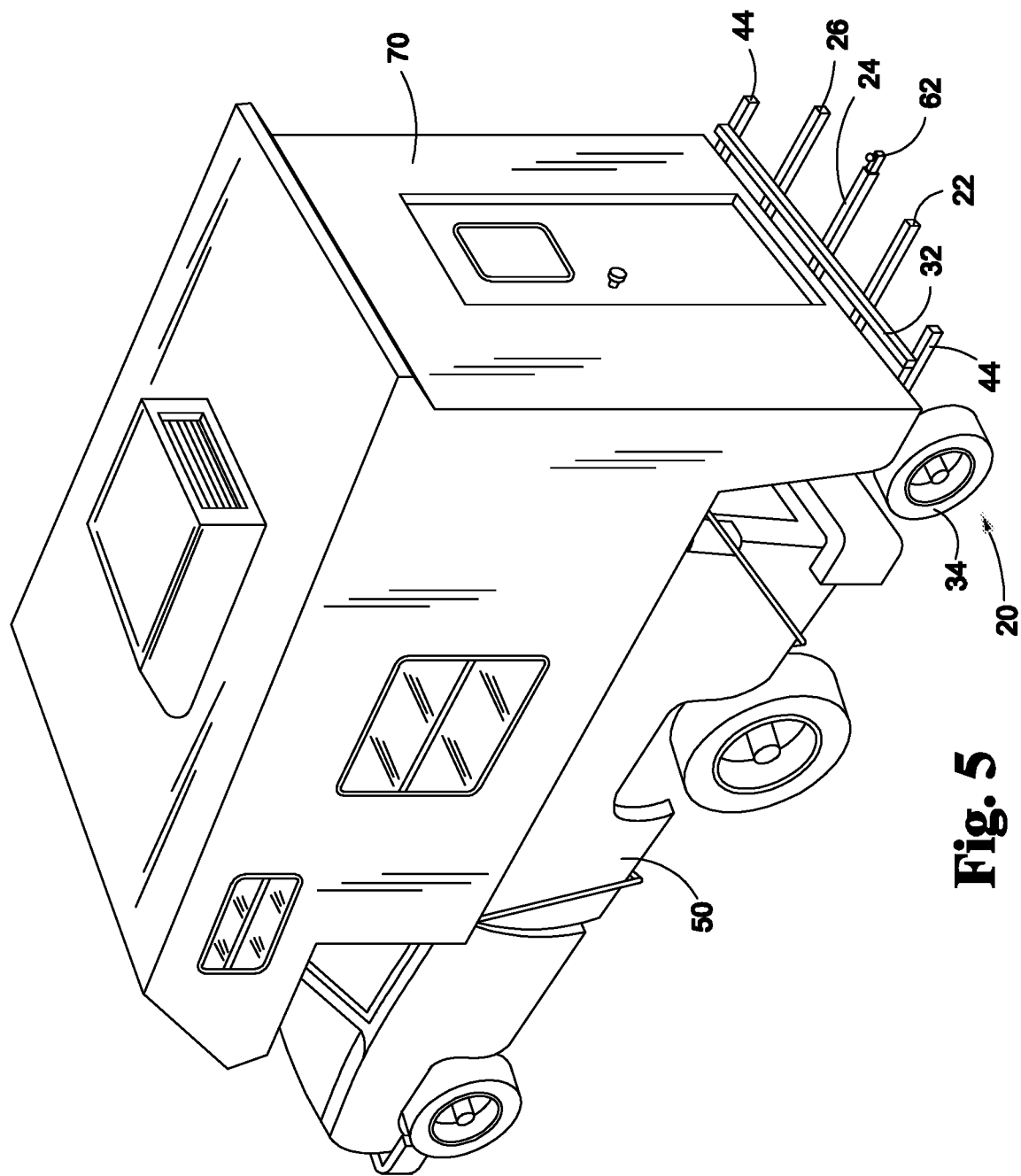
FIG. 5 illustrates a side perspective view of a vehicle with a WDTT in accordance with an embodiment of the present invention.

In embodiments of the present invention, WDTT frame 2 is used as a suspension system in a lifting fashion to leverage and transfer weight from the rear axle 58 of vehicle 50 (See FIG. 5). The total WDTT 20 is preferably assembled with bolts to allow use of axle adjusting shims 36 (See FIG. 3) to accurately balance the vehicle for driving safety. However, as would be known by one of ordinary skill in the art, other embodiments may comprise weldments or other means of securing some or all components. In one example, approximately 1000 lbs. of the vehicle rear axle 58 weight can be redistributed, moving approximately 30% of the weight to the vehicle front axle 56 and approximately 70% to the WDTT 20. The percentages can change with the measurements, dimensions and positions of the front axle 56, to rear axle 58 and to the tag axle 20 on different vehicles. The bolts employed to assemble the WDTT can be ½" grade 5 hard with nuts and lock washers or double nuts with retaining compound. The present design fosters lower production and labor costs than other auxiliary axle options making the WDTT 20 affordable. Cross beams 32 of frame 2 for WDTT 20 can be bolted with no welding. The WDTT 20 is adjustable for use with different vehicles providing an added advantage. Cross beams 32 couple all three beams 22, 24 and 26 together into the rectangular frame 2 but are not limited to such. At both ends of torsion axle assembly 40 (FIG. 6), a wheel assembly 34 is coupled providing for rotational movement of WDTT 20. Wheel assembly 34 is comprised of a rim and tires coupled to torsion axle assembly 40. The braking assembly can comprise commonly known electric brake drums or other known braking means, and allows for further vehicle stopping and slowing power when carrying extra weight. A unique advantage of the WDTT 20 is the additional 2000 lb. braking power provided when used as a tag axle only or as a replacement for a weight distribution hitch.

Figure 3:
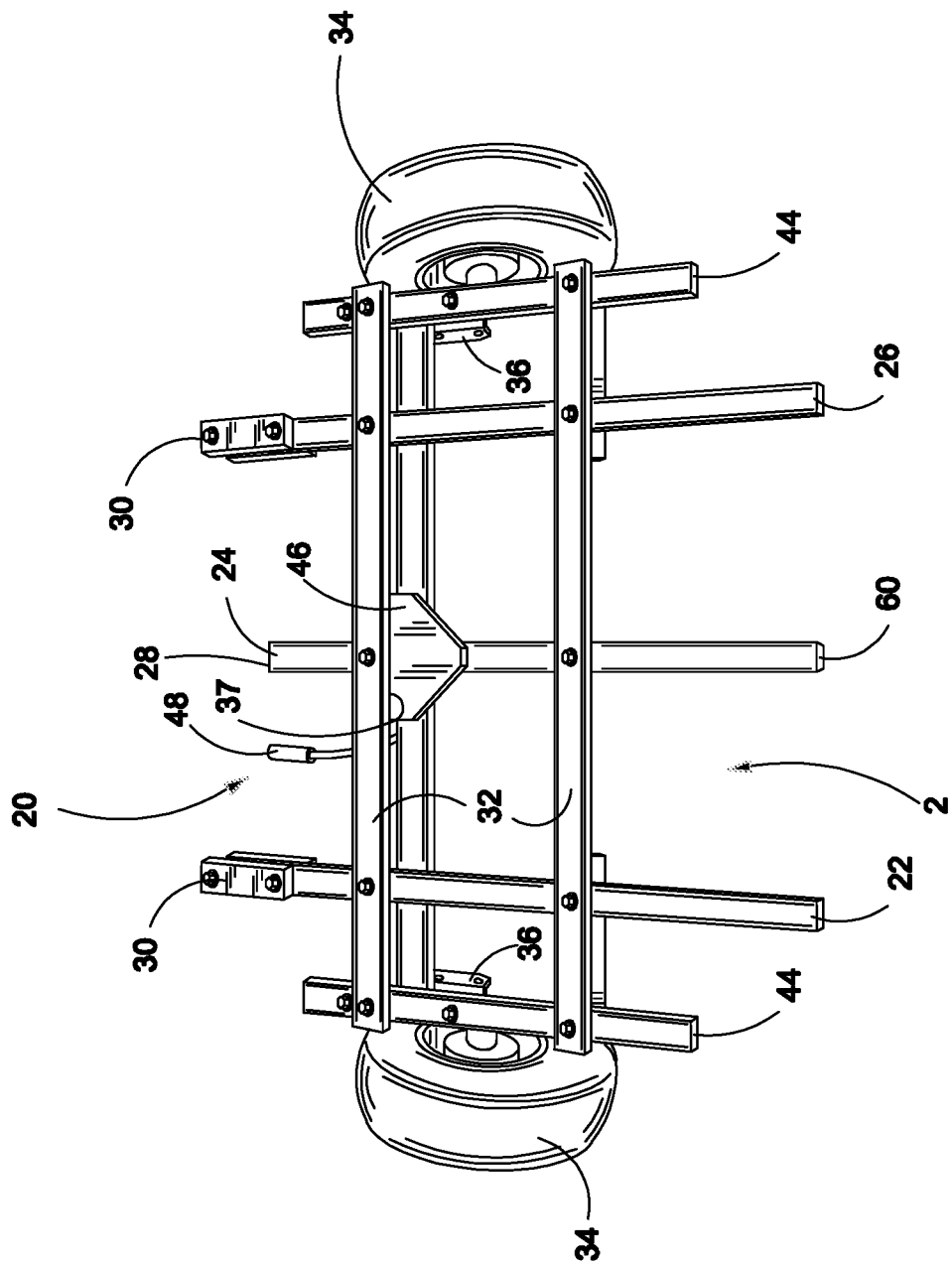
FIG. 3 illustrates an overhead view of a weight distribution tag trailer in accordance with an embodiment of the present invention.

With reference to FIG. 3, an overhead view of a weight distribution tag trailer in accordance with an embodiment of the present invention is shown. The torsion axle assembly 40 is shown in FIG. 6 as traversing from and coupling to both wheel assemblies 34. Referring back to FIG. 3, torsion axle assembly 40 is shown coupled to side axle beams 44 and running underneath three beams 22, 24 and 26 and part of frame 2. In this view, torsion axle assembly 40 and cross beams 32 can be shown bolted to side axle beams 44.

Optionally, an alignment plate 46 bolts to the center main beam 24 and has a perpendicular surface 37 (See FIG. 4) that rests against the rear surface 39 of the front cross beam 32. This guarantees that the frame 2 is in generally perpendicular alignment, fostering alignment of the trailer wheels 34 to those of the towing vehicle 50. The plate 46 also provides added stability to the WDTT 20 by coupling cross beams 32 and center beam 24.

A trailer electrical connector 48 is shown in FIG. 2. Electrical connector 48 can couple to vehicle 50 via a 4-pin or 7-way connector as is known in the art to provide power for indicator lights such as electric brakes, running lights, brake lights and turn signals, but the invention is not limited to these types of connectors and most any electrical connection is envisioned without departing from the spirit of the invention.

Figure 4:
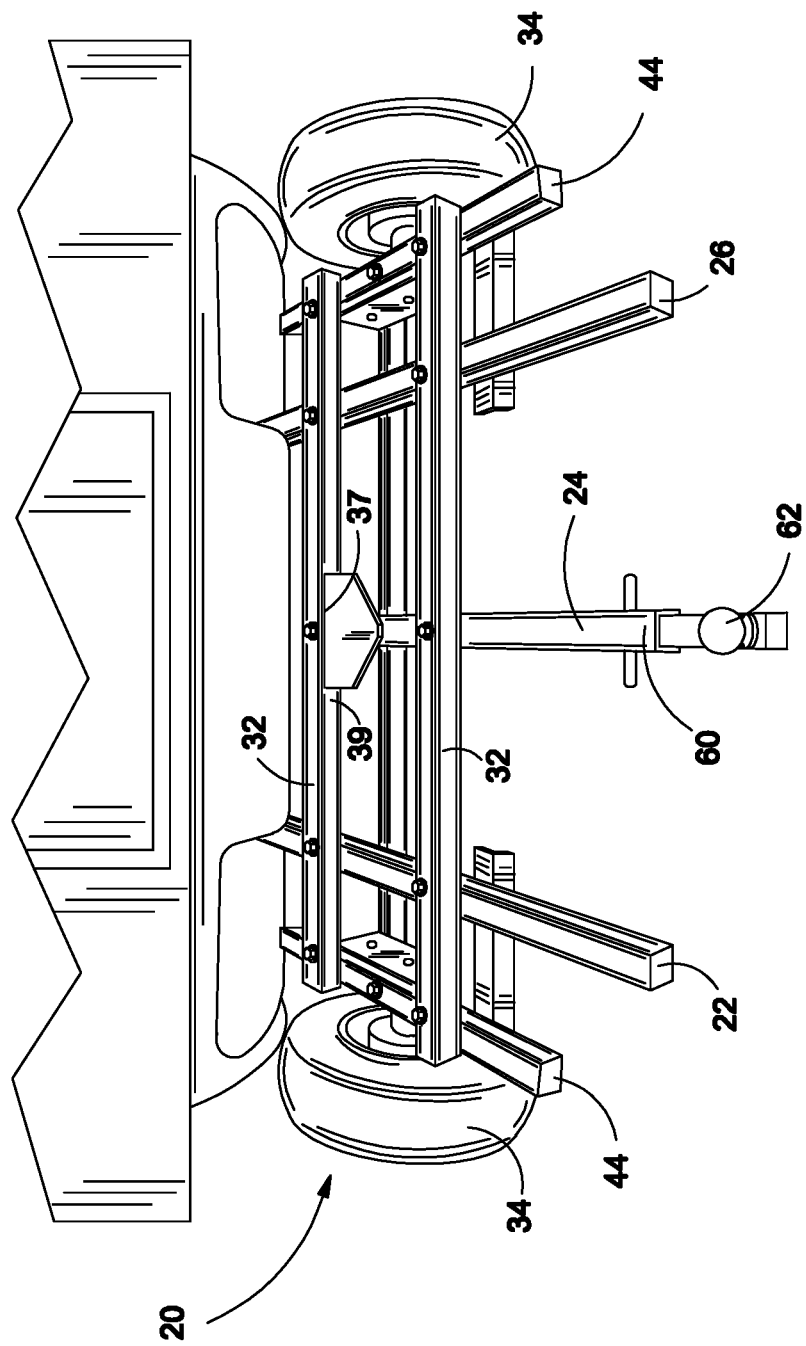
FIG. 4 illustrates a rear perspective view of a weight distribution tag trailer in accordance with an embodiment of the present invention.

A ball hitch 62 (as is known in the art and seen in FIGS. 4 and 5) can be attached to the rear of the center main beam 24 at receiver 60 to pull a trailer, effectively replacing a standard weight distribution hitch (see FIG. 4 and FIG. 5). The ball hitch 62 could be coupled at receiver 60 in most any fashion including a bolt carrier and cotter pin assembly without departing from the spirit of the invention.

Load and balance can be adjusted with shims 36 between torsion axle assembly 40 and side axle beams 44 as shown in FIG. 3. The model shown in FIG. 3 has GVWR (Gross Vehicle Weight Rating) of 2000 lbs. and is a non-steerable skid type. Thus, weight within the bed of a towing vehicle 50 can be distributed up to 2,000 lbs to WDTT 20.

Many truck campers 70 are designed to extend three feet or more past the rearward end of the pickup cargo bed which makes the vehicle 50 rear heavy and front light (See, e.g., FIG. 5). Adding WDTT 20 achieves a broader stance from corner to opposite corner for much safer and more stable driving (especially in windy conditions). More tires remain on the road in the case of a tire failure. Further, it is contemplated wheel assemblies 34 only contact ground when the vehicle 50 is loaded over, for example, but not for limitation, approximately 500 lbs., thus saving wear and tear on wheel assemblies 34.

With reference to FIG. 5, a side perspective view of a vehicle with a WDTT 20 in accordance with an embodiment of the present invention is shown. Vehicle 50 is shown carrying a "truck camper" 70. Considering truck campers can weigh between 2,000 to 6,000 lbs, WDTT 20 can relieve a portion of the weight of the camper 70 when properly attached as shown in FIG. 5. Storage box and steps are additional amenities for possible use on WDTT 20. While they have nothing to do with the operation of WDTT 20 they can provide additional user ease of use for camper 70 by providing ease of access to camper 70.

The invention is not to be limited to the embodiments described herein. The foregoing description has been presented for purposes of illustration and description. It is not intended to be an exhaustive list or limit any of the invention to the precise forms disclosed. It is contemplated other alternatives or exemplary aspects are considered included in the invention. The description is merely examples of embodiments, processes or methods of the invention. It is understood any other modifications, substitutions, and/or additions can be made, which are within the intended spirit and scope of the invention.

The invention claimed is:

1. A weight distribution tag trailer, comprising:
   a frame assembly, the frame assembly including at least two cross beams and at least two side axle beams coupled to form the frame assembly;
   an axle coupled to the frame assembly;
   at least two wheels rotatably mounted to the axle;
   a center main beam transversely coupled to the frame, said center main beam sized to be received by a receiver opening on a receiver hitch assembly;
   a first attachment beam transversely coupled to at least one of the two cross beams; and
   a second attachment beam transversely coupled to at least one of the two cross beams, wherein the tag trailer is associated with a receiver hitch assembly which is associated with a vehicle having a front axle and a rear axle thereby conditionally re-distributing weight from the rear axle and wherein the first attachment beam includes a first attachment clamp for coupling the first attachment beam to a receiver cross frame of the receiver hitch assemble and wherein the second attachment beam includes a second attachment clamp for attaching the second attachment beam to the cross frame of the receiver hitch assembly and wherein the first and second attachment clamps are attached with nut and bolt assemblies.

2. The tag trailer of claim 1, wherein re-distributing weight from the rear axle redistributes up to about 1,000 lbs.

3. The tag trailer of claim 1, wherein each of the attachment beams is bolted to the at least two cross beams.

4. The tag trailer of claim 1, wherein the axle is one of a torsion axle and spring axle and air axle.

5. The tag trailer of claim 1, further comprising brakes coupled to the at least two wheels.

6. The tag trailer of claim 5, further comprising brake lights electrically connected to the vehicle and operable by the vehicle.

7. The tag trailer of claim 6, wherein brake lights on the trailer are illuminated in response to an action wherein the action comprises activating the brakes.

8. The tag of claim 1, further comprising a ball hitch coupled to a distal end of the center main beam.

9. The tag trailer of claim 1, said tag trailer extending the frame of the vehicle and positioned to provide support to the vehicle when the rear axle becomes overloaded.

10. The tag trailer of claim 9, wherein a portion of weight redistributed from the rear axle is redistributed to the vehicle front axle and a second portion is redistributed to the weight distribution tag trailer.

11. The tag trailer of claim 10 wherein approximately 30% of the weight is redistributed to the front axle and approximately 70% of the weight is redistributed to the weight distribution tag trailer (WDTT).

* * * * *